P. BRADFORD.
Fasteners for the Meeting-Rails of Sashes.

No. 155,824.  Patented Oct. 13, 1874.

Witnesses.
E. H. Shumway
A. J. Tibbets

Pinmort Bradford
Inventor
By atty.

UNITED STATES PATENT OFFICE.

PURMORT BRADFORD, OF NEW HAVEN, CONNECTICUT, ASSIGNOR TO SARGENT & COMPANY, OF SAME PLACE.

IMPROVEMENT IN FASTENERS FOR THE MEETING RAILS OF SASHES.

Specification forming part of Letters Patent No. 155,824, dated October 13, 1874; application filed July 6, 1874.

*To all whom it may concern:*

Be it known that I, PURMORT BRADFORD, of New Haven, in the county of New Haven and State of Connecticut, have invented a new Improvement in Sash-Fasteners; and I do hereby declare the following, when taken in connection with the accompanying drawings and the letters of reference marked thereon, to be a full, clear, and exact description of the same, and which said drawings constitute part of this specification, and represent, in—

Figure 1:
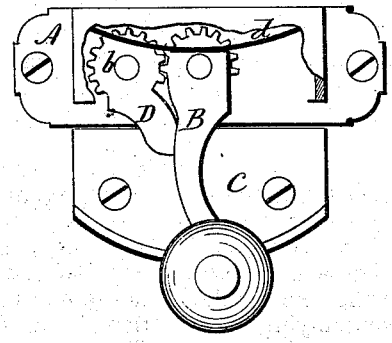
Figure 2:
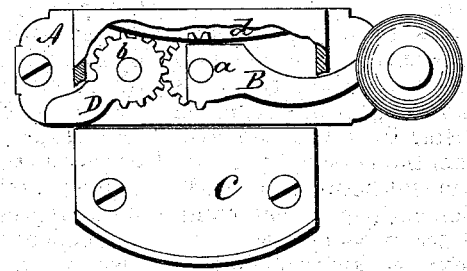

Figure 1, a top view, a portion of the case removed to show the mechanism, the parts in position as locked; Fig. 2, the same, the parts in position as unlocked.

This invention relates to an improvement in that class of sash-fasteners which consist of a lever attached to one rail of the sash, so as to be swung around and engage a keeper on the other, the object being to prevent the lever from being turned from the outside by the introduction of an instrument between the sash-rails; and the invention consists in combining with the lever a short arm in connection therewith by segmental gear, but swinging in opposite directions, so that the movement of the lever to lock the sash brings the said arm around from the opposite direction, so that the two close together over the joint to prevent the insertion of an instrument between the two, as more fully hereinafter described.

A is the base of the case, within which the locking-lever B is hung upon a pivot, *a*, and provided with a spring, *d*, to force the lever to either extreme, in substantially the usual manner for this class of fasteners. C is the keeper over which the lever locks, also in the usual manner. D is an arm hung upon a pivot, *b*, within the case, and in connection with the lever B, by teeth, as shown, or otherwise, so that the turning of the lever will at the same time turn the arm, as from the position in Fig. 1 to that in Fig. 2, and return. The arm D is constructed so as to meet or come into connection with the lever B over the joint between the two sashes, hence, if an instrument be introduced in the rear of the lever, it must pass up outside the arm D, and any power applied to the arm D to press back the lever B will only tend to hold it more firmly in its place. The arm D may be arranged with other connections with the lever B than this described without departing from the general principles of this invention, it only being essential that the turning of the lever shall throw an arm over the joint into connection with the lever to prevent any force being applied through the joint to turn the lever. While represented as applied to the lever of a common and well-known sash-fastener, I wish to be understood as embracing other constructions of sash-fasteners.

I claim as my invention—

The combination of the lever B of a sash-fastener, and the short arm D in connection therewith, so that the turning of the lever will close the said arm and lever together over the joint between the two sashes, substantially as set forth.

PURMORT BRADFORD.

J. H. SHUMWAY,
A. J. TIBBITS.